United States Patent [19]

Bolen et al.

[11] 4,381,200

[45] Apr. 26, 1983

[54] GLASS INSULATION WITH AN INSOLUBILIZED ASPHALT BINDER

[75] Inventors: Charles E. Bolen, Heath; Edward R. Harrington, Newark; Alfred Marzocchi, Newark; Michael G. Roberts, Newark, all of Ohio

[73] Assignee: Owens-Corning Fiberglas Corporation, Toledo, Ohio

[21] Appl. No.: 249,037

[22] Filed: Mar. 30, 1981

[51] Int. Cl.$^3$ .............................................. C08L 95/00
[52] U.S. Cl. .................................. 106/282; 106/274; 106/277; 252/62; 427/422; 428/291; 428/489; 162/156; 162/177; 427/389.7; 427/389.8
[58] Field of Search ............... 106/274, 277, 282; 252/62; 427/289.7; 428/291, 489; 162/156, 155, 171

[56] References Cited

U.S. PATENT DOCUMENTS

| | | | |
|---|---|---|---|
| 2,701,777 | 2/1955 | Farris | 117/126 |
| 2,712,506 | 7/1955 | Farris | 106/277 |
| 2,771,387 | 11/1956 | Kleist et al. | 154/93 |
| 2,811,769 | 11/1957 | Craig | 28/72.3 |
| 3,440,195 | 4/1969 | Norcross | 260/28.5 |
| 4,166,752 | 9/1979 | Marzocchi et al. | 106/273 N |
| 4,175,978 | 11/1979 | Marzocchi et al. | 106/281 R |
| 4,186,236 | 1/1980 | Heitmann | 428/291 |
| 4,211,575 | 7/1980 | Burris | 106/274 |
| 4,225,353 | 9/1980 | Beaudoin et al. | 106/275 |

FOREIGN PATENT DOCUMENTS 2842355  9/1979  Fed. Rep. of Germany .

*Primary Examiner*—John Kight, III
*Assistant Examiner*—Amelia B. Yarbrough
*Attorney, Agent, or Firm*—Ronald C. Hudgens; Robert F. Rywalski

[57] ABSTRACT

An improved process for forming an acoustical or thermal insulating fibrous glass product is provided, wherein the binder employed is asphalt and the asphalt is converted into a substantially insolubilized form.

5 Claims, No Drawings

GLASS INSULATION WITH AN INSOLUBILIZED ASPHALT BINDER

FIELD OF THE INVENTION

The present invention relates to the art of fibrous glass manufacturing and, more particularly, it relates to a process for forming acoustical or thermal insulating fibrous glass products. Even yet more particularly, the present invention relates to an insolubilized asphalt employed as the binder in such fibrous glass products.

BACKGROUND

Acoustical and thermal insulating fibrous glass products have been manufactured for many years. Such manufacturing typically involves a process which comprises attenuating the fibers, for example, with a rotary device, to produce a downwardly falling stream of fibers. During their downward flow path, a binder is sprayed onto the glass fibers and the sprayed fibers then collected on a conveyor in the form of a blanket. This blanket is then heated so as to bind the fibers with the binder. Typically, in the past, such binders were themosettable resins. Such resins have many desirable properties, but, unfortunately, they are relatively expensive.

In German Offenlegungsschrift No. 28 42 355, a chemically modified asphalt is taught. This chemically modified asphalt is the reaction product of asphalt, a vinyl aromatic monomer, for example, styrene, and a rubber. This publication teaches that when glass fibers are coated with such a chemically modified asphalt, the material can be insolubilized by an optional heating step carried out at temperatures in the range of about 200° to 500° F. (93° to 260° C.). Unfortunately, however, it will be appreciated that because of the chemical reaction which is needed to obtain the chemically modified asphalt, the costs of that material are increased relative to conventional asphalt which has not been chemically modified and, additionally, the materials used, i.e., the rubber and styrene, are commonly more expensive than asphalt. Consequently, the obtainment of the insolubilized chemically modified asphalt coating is penalized because of cost considerations.

SUMMARY OF THE INVENTION

In accordance with the present invention, an improvement is provided in the above type processes for forming acoustical or thermal insulating fibrous glass products. The improvement essentially resides in employing an asphalt emulsion as the binder and then heating the asphalt for a sufficient period of time to bind the fibers and to convert the asphalt to a substantially insolubilized form. Surprisingly, a tenaceous bond with such fibers will result without the need for a coupling agent and the insolubilized form of asphalt serves as an outstanding binder for such acoustical or thermal insulating fibrous glass products. Thus, the present invention allows the use of a relatively inexpensive, readily available material as the binder, i.e., asphalt. Normally, one would not expect that asphalt would be suitable for use as a binder for such products as acoustical and/or thermal insulation because of its physical properties. Moreover, asphalt exhibits strong solubility in numerous solvents and exhibits high flammability. Such solvents include toluene, hexane, methylene chloride, Stoddard solvent, aqueous sodium hydroxide solutions, and concentrated and dilute hydrochloric acid. By converting the asphalt to a substantially insolubilized form, the insolubilized asphalt becomes more in the nature of a thermoset resin and exhibits great resistance to such solvents and also exhibits self-extinguishing fire characteristics.

DESCRIPTION OF THE INVENTION

In accordance with the present invention, the asphalt is applied in the form of an aqueous emulsion using equipment that had been employed in the past to directly spray a binder onto a downwardly flowing stream of glass fibers. These fibers are then collected, as in the past, in the form of a blanket on a conveyor, and are heated at a temperature and for a time sufficient to remove water and convert the asphalt from its solvent soluble state to a virtually insolubilized form. For example, even afte immersion for 30 days in toluene and in methylene chloride there was substantially no detectable solubilization.

As used herein, the term asphalt means asphalts which are free of rubber and are non-chemically modified. That is, they are conventional asphalts not asphalts which have been combined with rubber or reacted with asphalt reactive materials, such as, for example, vinyl aromatics and rubber. Preferably, the asphalts for use herein are the air blown asphalts as well as asphalt flux. Representative air blown asphalts are AC-20, AC-10 and AC-5. Such asphalts are most desirably applied as an aqueous emulsion and the emulsion may be produced by techniques well known in the art. More conveniently, however, any of the numerous commericially available emulsions will be employed. Such emulsions are exemplified by those commercially available from the Koppers Chemical Company under their designation CRS-1 emulsion or their RS-1 emulsion. Another suitable emulsion is that available from Byerlite under their designation K-1-C. The emulsions employed in the practice of this invention may be either anionic, cationic or nonionic. As will be readily apparent, such emulsions will include the dispersed asphalt, water and an appropriate emulsifying agent. Preferably, a glass lubricant will be added to these emulsions. One such suitable lubricant is an acetic acid stabilized reaction product of tetraethylene pentamine and stearic acid. Other suitable lubricants include sulfonated mineral oils, polyoxyethylene stearates and oleates, sorbitan oleates and stearates, as well as isostearates.

Suitably, the emulsions which are applied will contain about 60 percent to about 98.5 (by weight) water. As applied, desirably the asphalt content of the emulsion will be about 1 percent to about 38.5 percent. The remainder of the asphalt emulsion will include an emulsifying agent, for example, a cationic, anionic or nonionic surfactant present in an amount sufficient to emulsifying the asphalt and preferably a lubricant. The lubricant will desirably be present in an amount of about 0.05% percent of about 1.0 percent (based on the weight of emulsion). Generally, the non-aqueous portion of the emulsion will contain about 1 percent to about 10 percent of the above-described materials. Usually the emulsion will be applied in sufficient amounts so that the final thermal or acoustical insulating product will contain about 1.0 to about 12.5 percent by weight of the insolubilized asphalt binder (based on the total weight of asphalt and glass). In order to enhance the properties of the final insolubilized form of asphalt, it is desirable to include sulphur in the emulsion. Fine results are obtained by employing a weight ratio of sulphur to asphalt between about 1.5:1.0 to about 1:20. Such sulphur serves to increase the bonding (crosslink) density and further reduces solubility in organic solvents.

After application of the asphalt emulsion to the downwardly moving stream of fibers, the fibers are collected as a blanket on a conveyor. The coated fibers are then heated for a sufficient period of time and at a sufficient temperature to remove the water and convert the asphalt to a substantially insolubilized form. This heating is done in the presence of a free oxygen containing gas, preferably air, and preferably is done at a temperature of at least about 140° C. for a period of time of at least about 50 hours. Thus, outstanding insolubilized asphalt binders have been obtained, for example, by heating at about 190° C. for about three days and at about 170° C. for about five days. Such insolubilized form of asphalt showed tenaceous bonding to the glass fibers.

Thus, by practicing the present invention, wherein the insolubilized form of asphalt is employed as a binder for acoustical and/or thermal insulating fibrous glass products, a binder will be obtained which has many desirable characteristics including high solvent resistance, one which exhibits self-extinguishing fire characteristics, and one which is relatively inexpensive compared to currently employed binders.

While the foregoing describes the present invention, it will, of course, be apparent that modifications are possible which, pursuant to the Patent Statutes and Laws, do not depart from the spirit and scope of the present invention.

We claim:

1. In a process for forming an acoustical or thermal insulating fibrous glass product comprising spraying a binder onto a downwardly flowing stream of glass fibers, collecting said sprayed fibers on a conveyor in the form of a blanket, and heating said blanket so as to bind the fibers with said binder, the improvement wherein said binder is a rubber-free, non-chemically modified asphalt emulsion and said heating comprises heating said asphalt for a sufficient period of time to bind said fibers and to convert said asphalt to a substantially insolubilized form, wherein said heating is done at a temperature of at least about 140° C. for a period of time of at least about 50 hours.

2. The process of claim 1 wherein said heating is done at at least about 190° C. for about at least three days.

3. The process of claim 1 wherein heating is done at about at least 170° C. for at least about five days.

4. The process of claim 1 wherein said asphalt emulsion is an emulsion of asphalt selected from the group consisting of asphalt flux or blown asphalt and mixtures thereof.

5. The process of claim 1 wherein said emulsion includes sulphur.

* * * * *